UNITED STATES PATENT OFFICE.

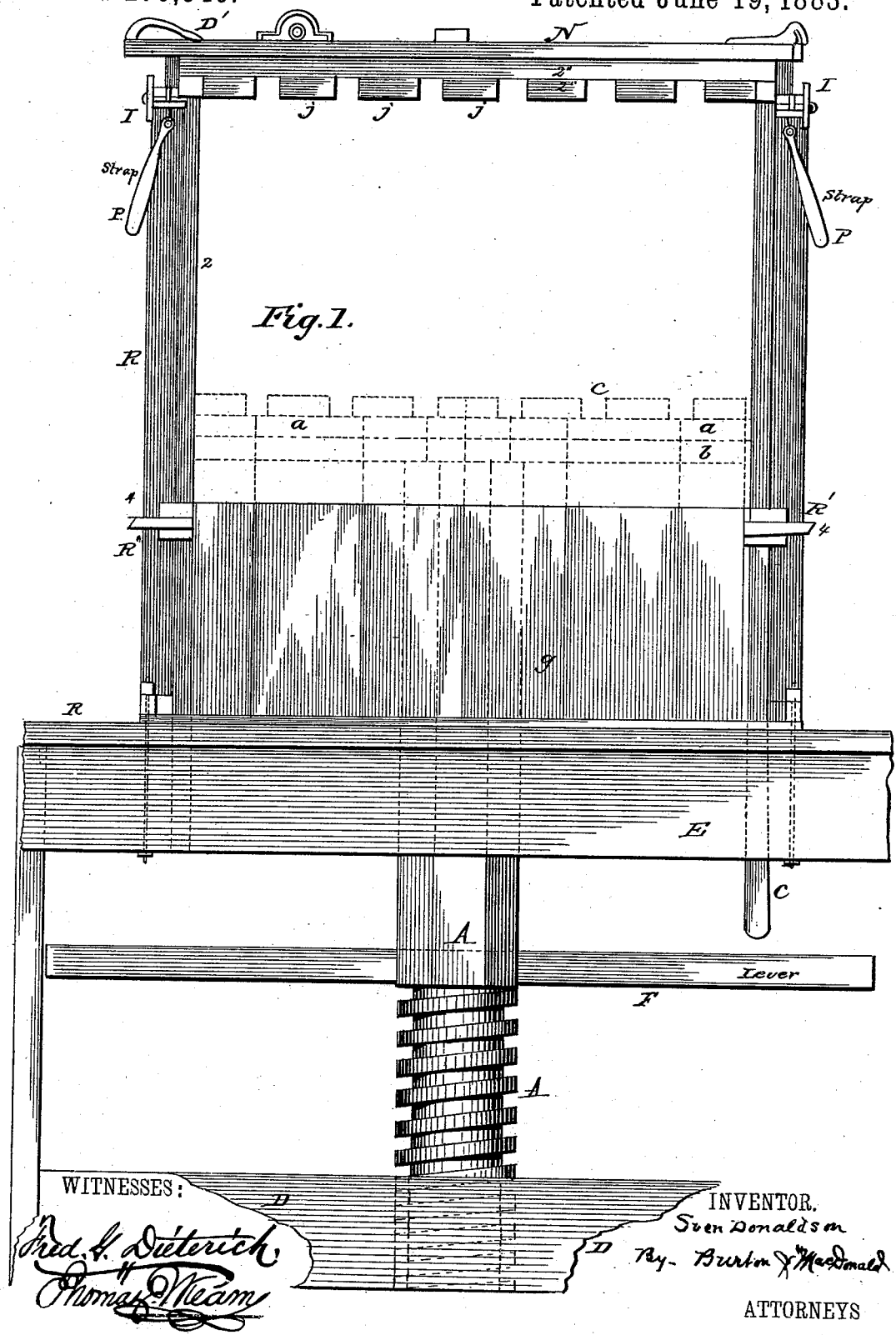

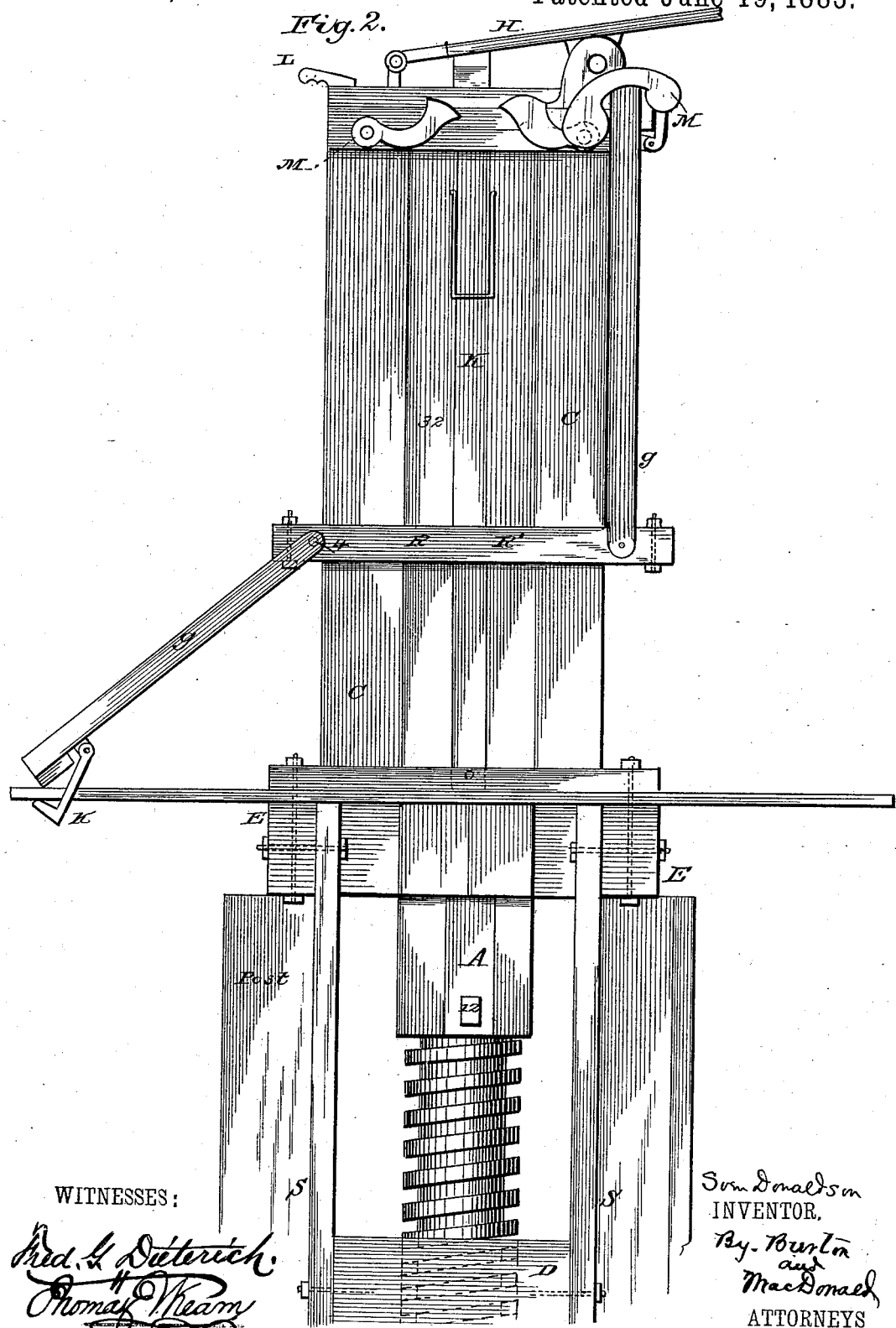

SVEN DONALDSON, OF TEXARKANA, TEXAS.

HAY AND COTTON PRESS.

SPECIFICATION forming part of Letters Patent No. 279,546, dated June 19, 1883.

Application filed March 19, 1883. (No model.)

*To all whom it may concern:*

Be it known that I, SVEN DONALDSON, a citizen of the United States of America, residing at Texarkana, in the county of Bowie and State of Texas, have invented certain new and useful Improvements in Hay and Cotton Presses, of which the following is a specification, reference being had therein to the accompanying drawings.

My invention relates to improvements in hay and cotton presses; and it consists in certain details of construction and arrangement of the various parts, as will be hereinafter more fully described in the specification, and pointed out in the drawings, in which—

Figure 1 is a front view of my improved hay and cotton press, and Fig. 2 an end view of same.

The object of the invention is to provide a hay and cotton press that can be easily and cheaply constructed and that can be operated by hand or horse power. It is necessary in those portions of the country where hay and cotton are produced to bale these products for convenience in shipping. Especially is a hand or horse power press necessary where there are no steam-power presses. This I have succeeded in obtaining in the following manner: A screw, A, is provided with a suitable lever, F, which can be operated either by hand or horse power. This screw is preferably made ten inches in diameter where the thread is cut and twelve inches where there is no thread. On the upper end of the screw is a circular iron casting, b, with a groove cut in it, and on the follow-block a is a corresponding iron casting to that on the end of the screw, this end of the screw being also provided with an iron spindle, c, which passes through the follow-block. The receiving-box C is generally of sufficient size for an eight-hundred-pound bale of cotton to be formed, although it may be of any desired size or capacity. The joists E are bolted to and support the platform R of the press. In order to prevent straining or bulging of the box C, a frame, R′, is placed around the box and the pieces bolted together. (See Fig. 2.) The side doors, g, are pivotally secured at 4 to this frame R′. At the middle and near the outer edge of each side door a hook, K, is pivotally attached, and these hooks or holding-pieces catch on the casting L on the top door, N, of the box and assist in preventing the door from rising up while the bale is being formed. The cam-shaped holding-pieces M, pivoted to the sides of the press, are turned over the tops of the doors when closed, and also assist in holding the parts together as the strain approaches the top of the press. The iron straps P, Fig. 1, pivotally secured to the press-frame, are also for the purpose of holding the top door, N, securely in place. These straps P pass over the irons D′ at the ends of the top door. When the pressure is removed and the bale formed these fastening devices are released, the side doors opened, and the bale drawn out. Tie or straining timbers S are bolted to the screw-sills D. The lever H is for the purpose of raising the upper door, N. The size of the timbers and the framing and joining depend on the size and requirements of the press, and all the parts properly braced and bolted.

Having thus described my invention, what I claim is—

1. The combination, in a hay and cotton press, of a suitable screw and follow-block, a box or receptacle supported as described, and provided with hinged side doors, a top door hinged as described, the doors being secured to the frame by pivoted hooks, catch-pieces, and pivoted cams M, substantially as and for the purpose set forth.

2. The combination, in a hay and cotton press, of the screw-sills, tie-timbers, and box-supporting platform, of the box or receptacle C, provided with two hinged side doors having the pivoted catch-pieces K, the top door, N, having the lever H and castings D′, the pivoted cam-pieces M, hinged strap P, screw A, and follow-block, substantially as and for the purpose set forth.

In testimony whereof I affix my signature, in presence of two witnesses, this 12th day of March, A. D. 1883.

SVEN DONALDSON.

Witnesses:
C. L. PITCHER,
REGINALD COLLISSON.